(12) United States Patent
Jang et al.

(10) Patent No.: US 12,509,574 B2
(45) Date of Patent: Dec. 30, 2025

(54) THERMOPLASTIC ELASTOMER RESIN COMPOSITION WITH IMPROVED FLUIDITY AND MOLDED ARTICLE PRODUCED THEREFROM

(71) Applicants: Hyundai Motor Company, Seoul (KR); Kia Corporation, Seoul (KR); GS Caltex Corporation, Seoul (KR)

(72) Inventors: Kyeong Hoon Jang, Seoul (KR); In Soo Han, Gyeonggi-do (KR); Jae Hyun An, Chungcheongnam-do (KR); Byung Wook Kang, Daejeon (KR); Woo Ram Kim, Daejeon (KR); Seok Jin Yong, Daejeon (KR)

(73) Assignees: Hyundai Motor Company, Seoul (KR); Kia Corporation, Seoul (KR); GS Caltex Corporation, Seoul (KR)

(*) Notice: Subject to any disclaimer, the term of this patent is extended or adjusted under 35 U.S.C. 154(b) by 297 days.

(21) Appl. No.: 18/085,266

(22) Filed: Dec. 20, 2022

(65) Prior Publication Data
US 2024/0043664 A1 Feb. 8, 2024

(30) Foreign Application Priority Data

Aug. 4, 2022 (KR) .................. 10-2022-0097040

(51) Int. Cl.
*C08L 9/06* (2006.01)
*C08L 23/16* (2006.01)

(52) U.S. Cl.
CPC ............... *C08L 9/06* (2013.01); *C08L 23/16* (2013.01); *C08L 2205/06* (2013.01); *C08L 2207/04* (2013.01); *C08L 2312/02* (2013.01)

(58) Field of Classification Search
None
See application file for complete search history.

(56) References Cited

U.S. PATENT DOCUMENTS

| | | | |
|---|---|---|---|
| 4,906,683 A | 3/1990 | Komatsu et al. | |
| 5,304,599 A | 4/1994 | Himes | |
| 7,134,929 B2 | 11/2006 | Chen | |
| 2004/0151933 A1 | 8/2004 | Ajbani et al. | |
| 2005/0245679 A1 | 11/2005 | Ajbani et al. | |
| 2006/0100347 A1* | 5/2006 | Ouhadi | C08L 23/10 524/502 |
| 2013/0303680 A1* | 11/2013 | Weaver | C08L 23/16 525/240 |
| 2016/0137825 A1* | 5/2016 | Jakuczek | C08L 23/22 524/508 |
| 2016/0289410 A1* | 10/2016 | Yamaguchi | C08L 23/12 |
| 2020/0024436 A1* | 1/2020 | Tsou | C08J 3/12 |

FOREIGN PATENT DOCUMENTS

| | | |
|---|---|---|
| KR | 100682100 B1 | 6/2007 |
| KR | 100738282 B1 | 7/2007 |
| KR | 2012-0000258 A | 1/2012 |
| KR | 101292092 B1 | 8/2013 |

OTHER PUBLICATIONS

2019 EPDM60 Data Sheet (Year: 2019).*
Kraton G products (Retrieved Dec. 5, 2024).*
MD1648 Datasheet (Year: 2019).*
Kraton MD grades (Retrieved Dec. 5, 2024).*
FSA Gasket Handbook 1st edition (Year: 2017).*

* cited by examiner

*Primary Examiner* — Robert S Jones, Jr.
*Assistant Examiner* — Lily K Sloan
(74) *Attorney, Agent, or Firm* — Fox Rothschild LLP

(57) ABSTRACT

Disclosed are a thermoplastic elastomer resin composition, and a molded article produced therefrom. The thermoplastic elastomer resin composition includes styrene-based synthetic rubber having a melt index in a range of 30 g/10 min to 100 g/10 min which is measured at a temperature of 190° C. and a load of 2.16 kg, a propylene-ethylene copolymer having a melt index in a range of 60 g/10 min to 150 g/10 min which is measured at a temperature of 230° C. and a load of 2.16 kg, cross-linked rubber, oil, an inorganic filler, and a lubricant in appropriate amounts.

12 Claims, No Drawings

THERMOPLASTIC ELASTOMER RESIN COMPOSITION WITH IMPROVED FLUIDITY AND MOLDED ARTICLE PRODUCED THEREFROM

CROSS REFERENCE TO RELATED APPLICATION

The present application claims priority to Korean Patent Application No. 10-2022-0097040, filed Aug. 4, 2022, the entire contents of which is incorporated herein for all purposes by this reference.

TECHNICAL FIELD

The present disclosure relates to a thermoplastic elastomer resin composition and a molded article produced therefrom. The thermoplastic elastomer resin composition may have improved fluidity and include each of styrene-based synthetic rubber having a melt index in a range of 30 g/10 min to 100 g/10 min which is measured at a temperature of 190° C. and a load of 2.16 kg, a propylene-ethylene copolymer having a melt index in a range of 60 g/10 min to 150 g/10 min which is measured at a temperature of 230° C. and a load of 2.16 kg, cross-linked rubber, oil, an inorganic filler, and a lubricant in appropriate amounts.

BACKGROUND

In general, vehicle parts are manufactured by methods such as leather wrapping, polyurethane spraying, in-mold graining (IMG) of thermoplastic elastomer sheet, overmolding of thermoplastic elastomer, painting, and non-painting depending on the required quality level. High-end materials having high-quality texture applied to methods such as leather wrapping or polyurethane spraying have been mostly used for high-end vehicles. In the related art, a method such as in-mold graining or overmolding has been partially applied to mid-grade vehicles. Typically, a method such as painting or non-paining has been used for most low-end vehicles and has been also applied to a considerable number of parts in economy vehicles. Recently, surface tactility in the vehicle part is considered to be an important factor during a painting process. As a result, the use of paints with high elasticity have widely increased.

However, when the painting process is added, there may be a limit that the cost of raw materials increases, and environmental problems emerge as well. In addition, a leather-like texture is difficult to be realized through the painting method. Furthermore, environmental problems such as occurrence of odors and volatile organic compounds (VOCs) may emerge due to the painting process. In addition, even though the wrapping method is manufactured by methods such as IMG and powder slush molding (PSM), the defect rate is high. Furthermore, since adhesives are necessary to be used for the attachment of materials, environmental problems such as occurrence of odors and VOCs may emerge.

As a result, in the related art, a double injection method has been proposed for the replacement of the above processes. However, a thermoplastic elastomer resin applied to the existing overmolding may be difficult to be double-injected in a skin-like form due to low fluidity.

Therefore, under the above circumstances, the situation is that materials having physical properties suitable to be widely applied to vehicle parts, as well as an excellent tactility and high fluidity applicable to a double injection method, are required to be developed.

SUMMARY OF THE INVENTION

In preferred aspects, provided is a thermoplastic elastomer resin composition having excellent tactility as well as improved fluidity capable of being applied to, e.g., a double injection method, and a molded article produced therefrom.

The thermoplastic elastomer or its composition as used herein may be a rubber or rubber-like olefin resin including or formed of long chainlike molecules that are capable of recovering their original shape after being stretched. Exemplary elastomer or rubber may include natural rubber, neoprene rubber, buna-s and buna-n rubber, which are modified or unmodified alkyl or aliphatic chains having carbon backbones linked together by single (C—C) or double (C=C) bonds.

The above and other objectives of the present disclosure will become more apparent from the following description, and will be realized by the means of the appended claims, and combinations thereof.

In an aspect, provided is a thermoplastic elastomer resin composition including: an amount of about 10% to 60% by weight of styrene-based synthetic rubber having a melt index in a range of 30 g/10 min to 100 g/10 min which is measure at a temperature of 190° C. and a load of 2.16 kg; an amount of about 10% to 30% by weight of a propylene-ethylene copolymer having a melt index in a range of 60 g/10 min to 150 g/10 min which is measured at a temperature of 230° C. and a load of 2.16 kg; an amount of about 10% to 50% by weight of cross-linked rubber; an amount of about 1% to 10% by weight of oil; an amount of about 1% to 5% by weight of an inorganic filler; and an amount of about 0.1% to 5% by weight of a lubricant. The % by weight are based on the total weight of the thermoplastic elastomer resin composition unless otherwise indicated.

As used herein, the term "styrene-based synthetic rubber" refers to a polymer obtained by chemical synthesis but not naturally obtained, and derived from polymerization of monomeric units including one or more styrene. Exemplary styrene-based synthetic rubber may also include backbone alkylene units (e.g., butylene, ethylene, propylene, or isoprene) such that the styrene groups may be present as pendant groups in the polymer chain.

As used herein, the term "propylene-ethylene copolymer" refers to a polymer or copolymer obtained by chemical synthesis between propylene monomers and ethylene monomers, which may be a random or block co-polymer.

As used herein, the term "cross-linked rubber" refers to a polymeric product made from cross-linking between the functional groups of monomers. In certain embodiments, the cross-linked rubber may occur among the styrene-based synthetic rubbers and the propylene-ethylene copolymers, or may occur by forming additional cross-linking spacer therebetween.

The styrene-based synthetic rubber may have a linear molecular structure.

The styrene-based synthetic rubber may include one or more selected from the group consisting of styrene-butylene-styrene, styrene-ethylene-butylene-styrene, styrene-ethylene-propylene-styrene, styrene-ethylene-ethylene-propylene-styrene, styrene-isoprene-styrene, and styrene-isoprene-butadiene-styrene.

The propylene-ethylene copolymer may include an amount of about 4% to 10% by weight of ethylene with respect to the total weight of the propylene-ethylene copolymer.

The cross-linked rubber may have a hardness (Shore A) in a range of about 35 to 80.

The cross-linked rubber may include fully cross-linked rubber or partially cross-linked rubber.

The partially cross-linked rubber may be rubber obtained by cross-linking a part of styrene-ethylene-butylene-styrene.

The fully cross-linked rubber may be rubber obtained by cross-linking an ethylene-propylene-diene monomer with a polypropylene resin.

The oil may include at least one selected from the group consisting of mineral oil, aromatic oil, naphthenic oil, and silicone oil.

The inorganic filler may include one or more selected from the group consisting of talc, nanoclays, glass fiber, micas, calcium carbonate, wollastonite, and barium sulfate.

The lubricant may include one or more selected from the group consisting of a fluorine-based lubricant, a silicone-based lubricant, an amide-based lubricant, a zinc-based lubricant, and a fatty acid-based lubricant.

In an aspect, provided is a molded article including the thermoplastic elastomer resin composition as described herein.

The molded article may have a melt index in a range of about 60 g/10 min to 100 g/10 min which is measured at a temperature of 190° C. and a load of 2.16 kg.

The molded article may have a thickness in a range of about 0.5 mm to 2.0 mm.

Also provided is a vehicle including the molded article as described herein.

The thermoplastic elastomer resin composition as described herein can provide a material having excellent tactility as well as high fluidity capable of being applied to a double injection method.

The thermoplastic elastomer resin composition as described herein can be double-injected in a skin-like form due to high fluidity.

Other aspects of the invention are disclosed infra.

Effects of the present disclosure are not limited to the effect mentioned above.

It should be understood that the effects of the present disclosure include all effects that can be inferred from the following description. It should be understood that the effects of the present disclosure include all effects which can be deduced from the following description.

DETAILED DESCRIPTION

Above objectives, other objectives, features, and advantages of the present disclosure will be readily understood from the following preferred embodiments associated with the accompanying drawings. However, the present disclosure is not limited to the embodiments described herein and may be embodied in other forms. The embodiments described herein are provided so that the disclosure can be made thorough and complete and that the spirit of the present disclosure can be fully conveyed to those skilled in the art. It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof. Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In an aspect, a thermoplastic elastomer resin composition may include an amount of about 10% to 60% by weight of styrene-based synthetic rubber having a melt index in a range of 30 g/10 min to 100 g/10 min which is measured at a temperature of 190° C. and a load of 2.16 kg; an amount of about 10% to 30% by weight of a propylene-ethylene copolymer having a melt index in a range of 60 g/10 min to 150 g/10 min which is measured at a temperature of 230° C. and a load of 2.16 kg; an amount of about 10% to 50% by weight of cross-linked rubber; an amount of about 1% to 10% by weight of oil; 1% to 5% by weight of an inorganic filler; and an amount of about 0.1% to 5% by weight of a lubricant. The % by weight are based on the total weight of the thermoplastic elastomer composition.

Hereinafter, each component constituting the thermoplastic elastomer resin composition according to the present invention will be described in more detail as follows.

(A) Styrene-Based Synthetic Rubber

The thermoplastic elastomer resin composition may include an amount of about 10% to 60% by weight of the styrene-based synthetic rubber based on the total weight of the thermoplastic elastomer composition.

When the content of the styrene-based synthetic rubber is less than about 10% by weight, it may be difficult to properly realize a leather-like texture, which is a characteristic of the styrene-based synthetic rubber. On the other hand, when the content of the styrene-based synthetic rubber is greater than about 60% by weight, the styrene-based synthetic rubber may swell due to an oil component, thereby reducing chemical resistance.

The styrene-based synthetic rubber is used to increase fluidity. For this purpose, the styrene-based synthetic rubber having a melt index in a range of about 30 g/10 min to 100 g/10 min which is measured at the temperature of 190° C. and the load of 2.16 kg may be used.

When the styrene-based synthetic rubber has a melt index of less than about 30 g/10 min (at the temperature of 190° C. and the load of 2.16 kg), it may be difficult to manufacture a thin product during injection due to insufficient flowability. On the other hand, when the styrene-based synthetic rubber has a melt index of greater than about 100 g/10 min (at the temperature of 190° C. and the load of 2.16 kg), the overall molecular weight of the entire composition may be reduced, resulting in a decrease in tensile strength and tearing strength. In addition, unpleasant odors and volatile organic compounds (VOCs) may occur, and light resistance may be insufficient.

The styrene-based synthetic rubber may have a linear molecular structure. The styrene-based synthetic rubber may include one or more selected from the group consisting of styrene-butylene-styrene, styrene-ethylene-butylene-styrene, styrene-ethylene-propylene-styrene, styrene-ethylene-ethylene-propylene-styrene, styrene-isoprene-styrene, and styrene-isoprene-butadiene-styrene. Preferably, the styrene-based synthetic rubber uses styrene-ethylene-butylene-styrene.

(B) Propylene-Ethylene Copolymer

The thermoplastic elastomer resin composition may include an amount of about 10% to 30% by weight of the propylene-ethylene copolymer based on the total weight of the thermoplastic elastomer composition.

When the content of the propylene-ethylene copolymer is less than about 10% by weight, tensile strength and tearing strength may decrease. On the other hand, when the content of the propylene-ethylene copolymer is greater than about 30% by weight, hardness may excessively increase. As a result, it may be difficult to realize a soft tactility.

The propylene-ethylene copolymer may include a copolymer of ethylene and propylene. Particularly, the propylene-ethylene copolymer may include an amount of about 4% to 10% by weight of ethylene with respect to the total weight the propylene-ethylene copolymer. When the propylene-ethylene copolymer includes ethylene in the content of less than about 4% by weight, hardness may increase, resulting in an unpleasant feel. On the other hand, when the propylene-ethylene copolymer includes ethylene in the content of greater than about 10% by weight, the hardness may decrease, thereby reducing scratch resistance.

The propylene-ethylene copolymer is used to increase fluidity. The propylene-ethylene copolymer may have a melt index in a range of about 60 g/10 min to 150 g/10 min which is measured at a temperature of 230° C. and a load of 2.16 kg.

When the propylene-ethylene copolymer has a melt index of less than about 60 g/10 min which is measured at the temperature of 230° C. and the load of 2.16 kg, it may be difficult to inject a thin product due to insufficient flowability. On the other hand, when the propylene-ethylene copolymer has a melt index of greater than about 150 g/10 min (at the temperature of 230° C. and the load of 2.16 kg), the overall molecular weight of the entire composition may be reduced, resulting in deterioration of mechanical properties.

(C) Cross-Linked Rubber

The thermoplastic elastomer resin composition may include an amount of about 10% to 50% by weight of the cross-linked rubber based on the total weight of the thermoplastic elastomer composition.

When the content of the cross-linked rubber is less than about 10% by weight, there may be a problem in that chemical resistance and heat resistance may be reduced due to a cross-linked structure formed inside the cross-linked rubber. On the other hand, when the content of the cross-linked rubber is greater than about 50% by weight, unpleasant odors may occur due to a cross-linking agent remaining in the cross-linked rubber. In addition, tensile strength may decrease due to an increase in rubber components.

The cross-linked rubber may have a hardness (Shore A) in a range of about 35 to 80.

When the cross-linked rubber has a hardness (Shore A) of less than about 35, scratch resistance may be reduced. When the cross-linked rubber has a hardness (Shore A) of greater than about 80, a product may have an unpleasant feel.

In the present disclosure, provided that the degree of cross-linking of the fully cross-linked rubber is 100, the partially cross-linked rubber may refer to having a cross-linking degree of about 50 or greater, about 60 or greater, about 70 or greater, about 80 or more, or about 90 or greater.

The partially cross-linked rubber may be rubber cross-linking a part of styrene-ethylene-butylene-styrene.

The fully cross-linked rubber may be rubber cross-linking an ethylene-propylene-diene monomer with a polypropylene resin.

(D) Oil

The thermoplastic elastomer resin composition may include an amount of about 1% to 10% by weight of the oil, based on the total weight of the thermoplastic elastomer composition.

The oil may improve flowability of the thermoplastic elastomer resin composition. Therefore, when the content of the oil is less than about 1% by weight, flowability and injection property may deteriorate. On the other hand, when the content of the oil is greater than about 10% by weight, unpleasant odors and VOCs may occur, and light resistance may be insufficient.

Preferably, the oil may include mineral oil having a kinematic viscosity of in a range of about 10 cSt to 30 cSt at a temperature of about 40° C.

(E) Inorganic Filler

The inorganic filler can increase stiffness and hardness of the thermoplastic elastomer resin composition. The thermoplastic elastomer resin composition may include an amount of about 1% to 5% by weight of the inorganic filler, based on the total weight of the thermoplastic elastomer composition.

Since the inorganic filler serves to prevent a bleeding phenomenon in the thermoplastic elastomer resin composition, it is necessary to add a predetermined amount of the inorganic filler.

Therefore, when the content of the inorganic filler is less than about 1% by weight, it may be difficult to prevent the oil from bleeding. On the other hand, when the content of the inorganic filler is greater than about 5% by weight, flowability may be insufficient and harness may increase, resulting in an unpleasant feel of a product.

The inorganic filler may include at least one selected from the group consisting of talc, nanoclays, glass fiber, micas, calcium carbonate, wollastonite, barium sulfate, and combinations thereof.

(F) Lubricant

Lubricants can enhance scratch resistance of a final product by reducing surface resistance.

The thermoplastic elastomer resin composition may include an amount of about 0.1% to 5% by weight of the lubricant, based on the total weight of the thermoplastic elastomer composition.

When the content of the lubricant is less than about 0.1% by weight, properties such as flowability, injection property, surface slip property, and scratch resistance of the thermoplastic elastomer resin composition may deteriorate. On the other hand, when the content of the lubricant is greater than about 5% by weight, tensile strength and tearing strength of a product may decrease. Furthermore, unpleasant odors and VOCs may occur, and light resistance may also be insufficient.

The lubricant may include one or more selected from the group consisting of a fluorine-based lubricant, a silicone-based lubricant, an amide-based lubricant, a zinc-based lubricant, and a fatty acid-based lubricant.

In another aspect, the present disclosure relates to a molded article produced from the thermoplastic elastomer resin composition.

The molded article may be obtained by molding the thermoplastic elastomer composition by a method such as extrusion molding, injection molding, compression molding, foam injection molding, low-pressure foam injection molding, or gas compression molding.

There is no limitation in the field in which the molded article is used. However, in order to replace a wrapping method with a double injection method, the molded article can be used as a molded article in the field in which properties such as high fluidity, as well as a leather-like texture, are importantly required. For example, the molded article may be preferably applied to parts such as vehicle parts, mechanical parts, electrical and electronic parts, office equipment such as computers, and miscellaneous goods. Preferably, the molded article can be applied to a double injection overmolding method for vehicles.

The molded article, according to the present disclosure may have a melt index in a range of about 60 g/10 min to 100 g/10 min as measured at a temperature of 190° C. and a load of 2.16 kg). In addition, the molded article, according to the present disclosure, may have a thickness in a range of about 0.5 mm to 2.0 mm.

Example

Hereinafter, the present disclosure will be described in more detail through specific examples. The following examples are only examples to help the understanding of the present disclosure, and the scope of the present disclosure is not limited thereto.

Examples and Comparative Examples

As shown in Tables 1 and 2 below, thermoplastic elastomer resin compositions were prepared in the forms with described ingredients in described ratios.

TABLE 1

| Composition (wt %) | (A-1) | (B-1) | (C) | (D) | (E) | (F) | Total |
|---|---|---|---|---|---|---|---|
| Example 1 | 55 | 20 | 15 | 5 | 2 | 3 | 100 |
| Example 2 | 46 | 15 | 27 | 7 | 2 | 3 | 100 |
| Example 3 | 38 | 12 | 34 | 10 | 3 | 3 | 100 |
| Example 4 | 26 | 18 | 44 | 7 | 2 | 3 | 100 |

[Composition component]
(A-1): As styrene-based synthetic rubber, styrene-ethylene-butadiene-styrene (SEBS) rubber having a melt index of 50 was used.
(B-1): A propylene-ethylene copolymer having a melt index of 100 was used.
(C): As cross-linked rubber, rubber prepared by dynamically cross-linking ethylene-propylene-diene monomer (EPDM) with polypropylene (PP) resin having a hardness of 60 A was used.
(D): As process oil, mineral oil having a kinetic viscosity of 20 cSt at a temperature of 40° C. was used.
(E): As an inorganic filler, $CaCO_3$ was used.
(F): As a lubricant, a silicone-based lubricant was used.

TABLE 2

| Composition (wt %) | (A-1) | (A-2) | (B-1) | (B-2) | (C) | (D) | (E) | (F) | (G) | Total |
|---|---|---|---|---|---|---|---|---|---|---|
| Comparative Example 1 | 68 | — | 11 | — | 14 | 3 | 1 | 3 | — | 100 |
| Comparative Example 2 | — | 38 | 12 | — | 34 | 10 | 3 | 3 | — | 100 |
| Comparative Example 3 | 36 | — | 40 | — | 12 | 7 | 2 | 3 | — | 100 |
| Comparative Example 4 | 55 | — | — | 20 | 15 | 5 | 2 | 3 | — | 100 |
| Comparative Example 5 | 18 | — | 12 | — | 61 | 5 | 1 | 3 | — | 100 |
| Comparative Example 6 | 58 | — | 27 | — | — | 10 | 2 | 3 | — | 100 |
| Comparative Example 7 | 33 | — | 12 | — | 30 | 20 | 2 | 3 | — | 100 |
| Comparative Example 8 | 55 | — | 21 | — | 16 | 5 | — | 3 | — | 100 |
| Comparative Example 9 | 55 | — | 22 | — | 16 | 5 | 2 | — | — | 100 |
| Comparative Example 10 | — | — | 20 | — | 15 | 5 | 2 | 3 | 55 | 100 |

[Composition component]
(A-1): As styrene-based synthetic rubber, styrene-ethylene-butadiene-styrene (SEBS) rubber having a melt index of 50 at a temperature of 190 ° C. and a load of 2.16 kg was used.
(A-2): As Styrene-based synthetic rubber, styrene-ethylene-butadiene-styrene (SEBS) rubber having a melt index of 15 at a temperature of 190 ° C., and a load of 2.16 kg was used.
(B-1): A propylene-ethylene copolymer having a melt index of 100 at a temperature of 230° C. and a load of 2.16 kg was used.
(B-2): A propylene-ethylene copolymer having a melt index of 10 at a temperature of 230° C. and a load of 2.16 kg was used.
(C): As cross-linked rubber, rubber prepared by dynamically cross-linking ethylene-propylene-diene monomer (EPDM) with polypropylene (PP) resin having a hardness of 60 A was used.
(D): AS process oil, mineral oil having a kinetic viscosity of 20 cSt at a temperature of 40° C. was used.
(E): As an inorganic filler, $CaCO_3$ was used.
(F): As a lubricant, a silicone-based lubricant was used.
(G): As olefin-based rubber, ethylene-octene rubber having a melt index of 15 at a temperature of 190° C. and a load of 2.16 kg was used.

After using the thermoplastic elastomer resin compositions described in Examples and Comparative Examples to produce injection sheets with an injection machine, specimens for measurement of physical properties were prepared.

Then, the physical properties of the prepared specimens were measured by an evaluation method according to the following criteria and results thereof are shown in Table 3 below.

Evaluation Method (1) Melt index: Melt index of the specimen was measured under the conditions at a temperature of 190° C. and a load of 2.16 kg.

(2) Tensile strength and tearing strength: Tensile strength and tearing strength of the specimen were measured using a universal testing machine (UTM) according to MS 300-31 standard.

(3) Hardness: Using a shore A durometer, a hardness value was measured 15 seconds after inserting the specimen.

(4) Light resistance: Using MS210-05 equipment, light resistance of the specimen was measured under conditions at a temperature of 89±3° C., a relative humidity of 50±5%, and an exposure of 126 MJ/m$^2$ (65.5 W/m$^2$*530 hr).

(5) Scratch resistance: According to the Erichsen method, the scratch resistance of the specimen was measured under the condition at a load of 10 N (in this case, O, Δ, and X refer to sufficient, moderate, and insufficient scratch resistances).

(6) Moldability: The specimen was injected into a 1.6-mm thickness to check whether the specimen was molded or not (in this case, O, Δ, and X refer to sufficient, moderate, and insufficient moldabilities).

TABLE 3

| Evaluation criteria (physical property) | Melt Index (g/10 min) | Tensile Strength (MPa) | Tearing Strength (kg/cm) | Hardness (Shore A) | Scratch resistance (delta L) | Light resistance | Moldability |
|---|---|---|---|---|---|---|---|
| Example 1 | 91 | 9.1 | 44 | 75 | 0.6 | O | O |
| Example 2 | 84 | 8.9 | 39 | 65 | 0.4 | O | O |
| Example 3 | 72 | 8.8 | 37 | 60 | 0.8 | O | O |
| Example 4 | 66 | 7.9 | 40 | 63 | 1.0 | O | O |
| Comparative Example 1 | 144 | 7.2 | 39 | 54 | 0.7 | X | O |
| Comparative Example 2 | 22 | 6.7 | 36 | 66 | 0.8 | O | X |
| Comparative Example 3 | 55 | 9.5 | 50 | 95 | 1.8 | X | Δ |
| Comparative Example 4 | 54 | 8.8 | 43 | 72 | 0.9 | O | X |
| Comparative Example 5 | 43 | 5.4 | 34 | 60 | 1.2 | O | Δ |
| Comparative Example 6 | 93 | 9.2 | 42 | 66 | 0.7 | Δ | Δ |
| Comparative Example 7 | 212 | 4.4 | 29 | 51 | 1.4 | X | O |
| Comparative Example 8 | 92 | 8.9 | 43 | 75 | 0.6 | O | Δ |
| Comparative Example 9 | 87 | 9.1 | 43 | 77 | 2.4 | O | O |
| Comparative Example 10 | 21 | 6.1 | 33 | 68 | 1.4 | Δ | X |

As shown in Table 3, the specimen prepared in Comparative Example 1, in which greater than 60% by weight of the styrene-based synthetic rubber was used, had relatively low hardness and insufficient light resistance compared to those prepared in Examples.

In addition, the specimen prepared in Comparative Example 2, in which the styrene-based synthetic rubber having a melt index of less than 30 g/10 min measured at the temperature of 190° C. and the load of 2.16 kg was used, had relatively low tensile strength and insufficient moldability compared to those prepared in Examples.

In addition, the specimen prepared in Comparative Example 3, in which greater than 30% by weight of the propylene-ethylene copolymer was used, had relatively high scratch resistance and insufficient light resistance and moldability compared to those prepared in Examples.

In addition, the specimen prepared in Comparative Example 4, in which the propylene-ethylene copolymer having a melt index of less than 60 g/10 min measured at the temperature of 230° C. and the load of 2.16 kg was used, had insufficient moldability.

In addition, the specimen prepared in Comparative Example 5, in which greater than 50% by weight of the cross-linked rubber was used, had relatively low tensile strength and tearing strength, and insufficient moldability compared to those prepared in Examples.

In addition, the specimen prepared in Comparative Example 6, in which no cross-linked rubber was used, had relatively insufficient light resistance and moldability compared to those prepared in Examples.

In addition, the specimen prepared in Comparative Example 7, in which greater than 10% by weight of the oil was used, had relatively low tensile strength and tearing strength, and insufficient light resistance compared to those prepared in Examples.

In addition, the specimen prepared in Comparative Example 8, in which no inorganic filler was used, had relatively insufficient moldability compared to those prepared in Examples.

In addition, the specimen prepared in Comparative Example 8, in which no inorganic filler was used, had relatively insufficient moldability compared to those prepared in Examples.

In addition, the specimen prepared in Comparative Example 9, in which no lubricant was used, had relatively low scratch resistance compared to those prepared in Examples.

In addition, the specimen prepared in Comparative Example 10, in which the olefin-based rubber was used instead of the styrene-based synthetic rubber, had relatively low tensile strength and tearing strength as well as insufficient light resistance and moldability compared to those prepared in Examples.

On the other hand, the specimens of Examples 1 to 4 were prepared by mixing each of 10% to 60% by weight of the styrene-based synthetic rubber having the melt index in the range of 30 g/10 min to 100 g/10 min as measured at the temperature of 190° C. and the load of 2.16 kg, 10% to 30% by weight of the propylene-ethylene copolymer having the melt index in the range of 60 g/10 min to 150 g/10 min as measured at the temperature of 230° C. and the load of 2.16 kg, 10% to 50% by weight of the cross-linked rubber, 1% to 10% by weight of the oil, 1% to 5% by weight of the inorganic filler, and 0.1% to 5% by weight of the lubricant in appropriate amounts. As a result, the specimens of Examples 1 to 4 had high quality wherein all properties including high fluidity, tensile strength, tearing strength, hardness, scratch resistance, light resistance, and moldability are balanced with each other.

Therefore, by mixing each component in appropriate amounts, the thermoplastic elastomer resin composition as described herein can provide a material having high fluidity applicable to a double injection method as well as excellent emotional quality by providing a leather-like texture. Thus, according to an exemplary embodiment of the present disclosure, a wrapping method can be replaced by the double injection method. As a result, a defect rate can significantly decrease compared to the existing wrapping method, thereby reducing cycle time of process and reducing manufacturing costs.

Furthermore, according to various exemplary embodiments of the present disclosure, an adhesive used during bonding of a core and a skin through double injection is unnecessary. As a result, the thermoplastic elastomer resin composition can provide an eco-friendly advantage compared to a painting method in which volatile organic compounds (VOCs) occur in a large amount.

In addition, according to various exemplary embodiments of the present disclosure, only a small amount of oil is needed due to the high fluidity of the thermoplastic elastomer resin composition, thereby enhancing light-resistance performance and heat-resistance performance. In addition, the thermoplastic elastomer resin composition can be double-injected in a skin-like form due to the high fluidity.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Therefore, preferred embodiments of the present disclosure have been described for illustrative purposes, and should not be construed as being restrictive.

What is claimed is:

1. A thermoplastic elastomer resin composition comprising:
    an amount of about 10% to 60% by weight of styrene-based synthetic rubber having a melt index in a range of 30 g/10 min to 100 g/10 min which is measure at a temperature of 190° C. and a load of 2.16 kg;
    an amount of about 12% to 30% by weight of a propylene-ethylene copolymer having a melt index in a range of 60 g/10 min to 150 g/10 min which is measured at a temperature of 230° C. and a load of 2.16 kg;
    an amount of about 10% to 50% by weight of cross-linked rubber;
    an amount of about 1% to 10% by weight of oil;
    an amount of about 1% to 5% by weight of an inorganic filler; and
    an amount of about 0.1% to 5% by weight of a lubricant,
    wherein the % by weight is based on the total weight of the thermoplastic elastomer resin composition, and
    wherein the cross-linked rubber is obtained by cross-linking an ethylene-propylene-diene monomer with a polypropylene resin.

2. The thermoplastic elastomer resin composition of claim 1, wherein the styrene-based synthetic rubber comprises a linear molecular structure.

3. The thermoplastic elastomer resin composition of claim 1, wherein the styrene-based synthetic rubber comprises one or more selected from the group consisting of styrene-butylene-styrene, styrene-ethylene-butylene-styrene, styrene-ethylene-propylene-styrene, styrene-ethylene-ethylene-propylene-styrene, styrene-isoprene-styrene, and styrene-isoprene-butadiene-styrene.

4. The thermoplastic elastomer resin composition of claim 1, wherein the propylene-ethylene copolymer comprises an amount of about 4% to 10% by weight of ethylene with respect to the total weight of the propylene-ethylene copolymer.

5. The thermoplastic elastomer resin composition of claim 1, wherein the cross-linked rubber comprises a hardness (Shore A) in a range of about 35 to 80.

6. The thermoplastic elastomer resin composition of claim 1, wherein the oil comprises one or more selected from the group consisting of mineral oil, aromatic oil, naphthenic oil, and silicone oil.

7. The thermoplastic elastomer resin composition of claim 1, wherein the inorganic filler comprises one or more selected from the group consisting of talc, nanoclays, glass fiber, micas, calcium carbonate, wollastonite, and barium sulfate.

8. The thermoplastic elastomer resin composition of claim 1, wherein the lubricant comprises one or more selected from the group consisting of a fluorine-based lubricant, a silicone-based lubricant, an amide-based lubricant, a zinc-based lubricant, and a fatty acid-based lubricant.

9. A molded article comprising a thermoplastic elastomer resin composition of claim 1.

10. The molded article of claim 9, wherein the molded article has a melt index in a range of 60 g/10 min to 100 g/10 min which is measured at a temperature of 190° C. and a load of 2.16 kg.

11. The molded article of claim 9, wherein the molded article has a thickness in a range of about 0.5 mm to 2.0 mm.

12. A vehicle comprising a molded article of claim 9.

* * * * *